| X | IX | VIII | VII | VI | V | IV | III | II | I | Dét./t(sec) |
|---|----|------|-----|----|----|----|----|----|---|------------|
|   |    |      |     |    |    |    |    | AN | O | 0 |
|   |    |      |     |    |    |    | AN | O  |   | 6 |
|   |    |      |     |    |    | AN | O  |    |   | 12 |
|   |    |      |     |    | AN | O  |    |    |   | 18 |
|   |    |      |     | AN | O  |    |    |    |   | 24 |
|   |    |      | AN  | O  |    |    |    |    |   | 30 |
|   |    | AN   | O   |    |    |    |    |    |   | 36 |
|   | AN | O    |     |    |    |    |    |    |   | 42 |
| AN | O |      |     |    |    |    |    |    |   | 48 |
| O  |    |      |     |    |    |    |    |    | AN | 54 |
| CS |    |      |     |    |    |    |    |    |    | 59 |
|   |    |      |     |    |    |    |    | AN | O  | 60 |
|   |    |      |     |    |    |    | AN | O  |    | 66 |
|   |    |      |     |    |    | AN | O  |    |    | 72 |
|   |    |      |     |    | AN | O  |    |    |    | 78 |
|   |    |      |     | AN | O  |    |    |    |    | 84 |
|   |    |      | AN  | O  |    |    |    |    |    | 90 |
|   |    | AN   | O   |    |    |    |    |    |    | 96 |
|   | AN | O    |     |    |    |    |    |    |    | 102 |
| AN | O |      |     |    |    |    |    |    |    | 108 |
| O  |    |      |     |    |    |    |    |    | AN | 114 |
| CS |    |      |     |    |    |    |    |    |    | 119 |
|   |    |      |     |    |    |    |    | AN | O  | 120 |
|   |    |      |     |    |    |    | AN | O  |    | 126 |
|   |    |      |     |    |    | AN | O  |    |    | 132 |
|   |    |      |     |    |    | AN | O  |    |    | 138 |

Fig. 4

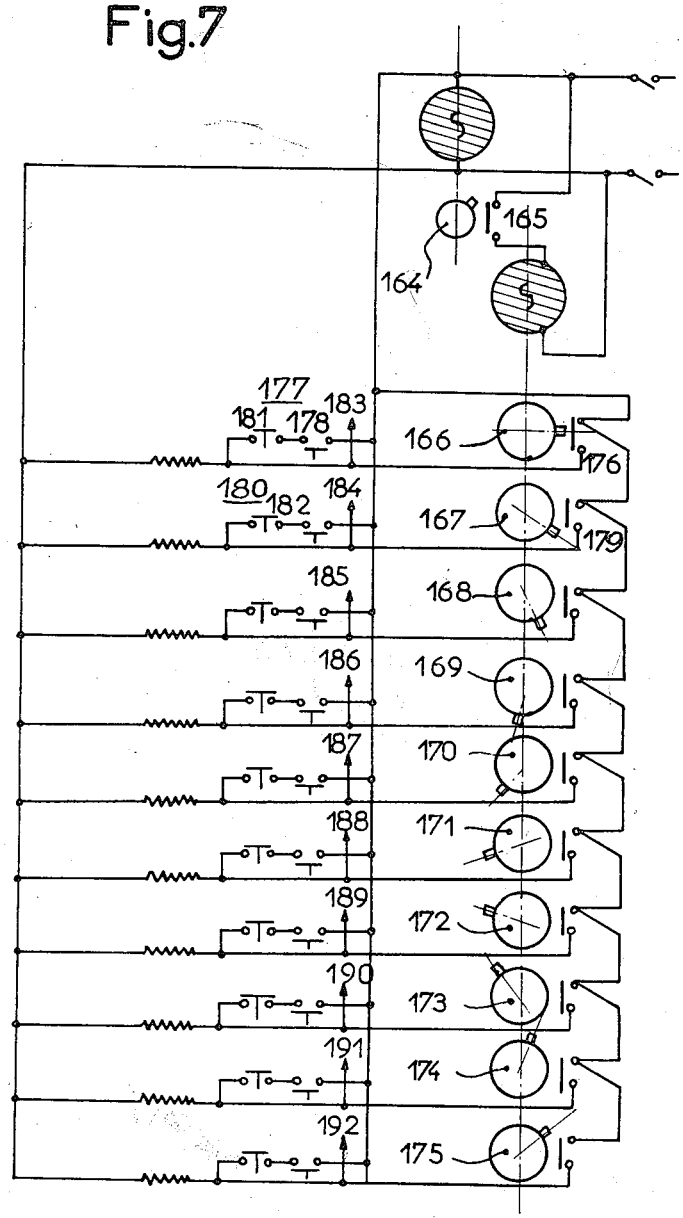

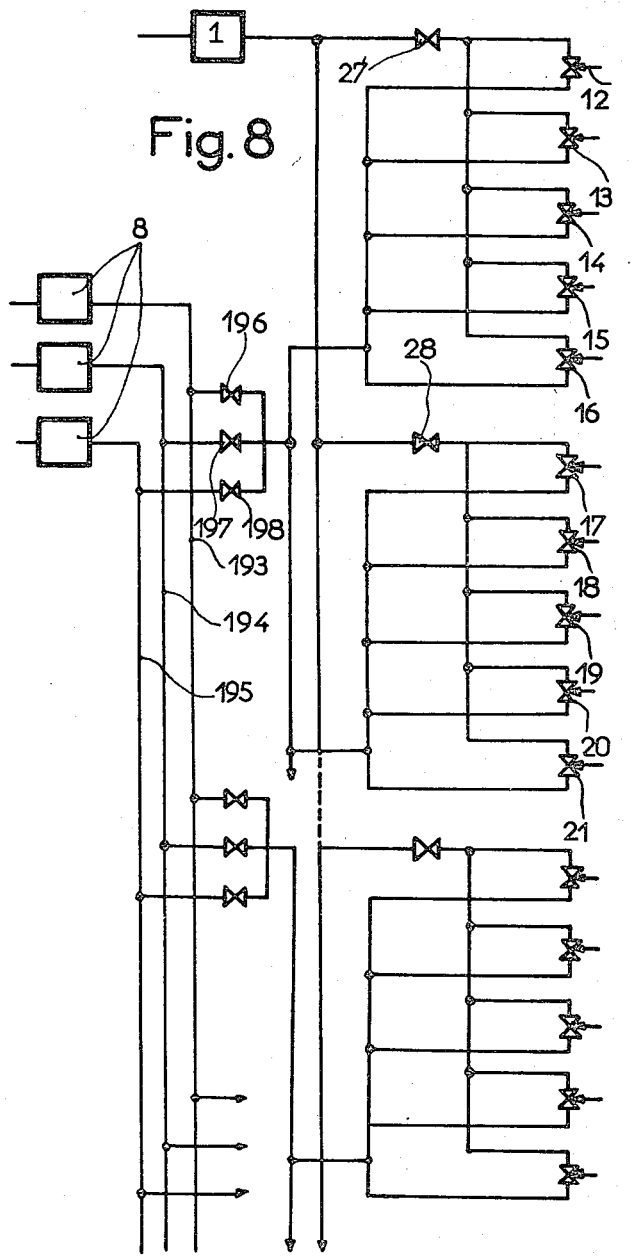

United States Patent Office 3,116,210
Patented Dec. 31, 1963

3,116,210
ARRANGEMENTS FOR DETECTING RADIATION CONTAMINATION OF THE COOLANT IN AN ATOMIC REACTOR
Roland Cochinal, Paris, André Roguin, Antony, and René Donguy, Vanves, France, assignors to Commissariat a l'Energie Atomique, Paris, France
Filed Mar. 23, 1959, Ser. No. 801,039
Claims priority, application France Mar. 28, 1958
3 Claims. (Cl. 176—19)

The present invention relates to arrangements for detecting contamination of coolant fluid in atomic reactors.

In current practice with natural-uranium reactors cooled by fluid circulation, the fuel rods are protected from corrosion by a fluid-tight sheath. It is very important for warning to be given as rapidly as possible of any damage (for example cracks or corrosion) which may occur to the sheaths on the fuel rods. These cracks may become worse more or less rapidly, and it is essential for the operator to have supervisory appliances which allow any irregularity to be detected almost immediately.

A known process consists in taking off a sample of the cooling fluid in each duct containing a fuel rod, and in directing each sample of fluid to a radiation detector which measures its activity. This process is diagrammatically illustrated in FIGURE 1 of the accompanying drawings. The detector 1, which is successively fed by the valves 2, 3 and 4, is so adjusted that, when the activity which it indicates exceeds a certain threshold, the suspected sample of fluid is automatically diverted by means of the valves 5, 6 and 7 to a supervisory detector 8; the testing may, if desired, be continued among the other ducts.

This simple process can only be used with a reactor comprising a small number of ducts; the number of ducts explored is conditioned by the maximum duration T of a supervision cycle and the time $t$ required to examine a duct. T and $t$ are determined by considerations of safety, and are of the order of thirty minutes and one minute respectively. This process therefore cannot be used with reactors comprising more than thirty ducts.

With larger reactors, the number of detectors may, for example, be multiplied, but this rapidly becomes prohibitive for reasons of bulk and maintenance. A plurality of ducts may also be supervised at the same instant by grouping them together. An example of this is diagrammatically illustrated in FIGURE 2 of the accompanying drawings. During the normal operating cycle, the valves 9 are open, as also is one of the valves 10 corresponding to the group being examined. When an irregularity is discovered by the detector 1, this valve 10 is automatically closed, and a valve 11 (corresponding to the group being examined) is opened in order to direct the fluid to the supervisory detector 8. Each of the valves 9 is successively opened in order to localise the duct responsible and supervise it. The testing continues among the other groups which are assumed to be in good condition, by successive opening of the valves 10.

This method has the disadvantage of requiring the valves 9 of all the ducts in the same group, and the valve 10 which feeds the detector 1, to be operated simultaneously in the normal operating cycle. In addition, when an irregularity is discovered by the detector 1, the valves 9 must be operated one by one in order to direct the quantities taken off to the supervisory detector 8. The result of this is a certain degree of complication in the remote-control circuits of the valves.

The present invention relates to a change-over device which may be used to detect sheath fractures in mixed atomic reactors, which mitigates the disadvantages explained above, and which furthermore allows better use to be made of the sampling circuits for the cooling fluid.

According to the invention there are provided arrangements for detecting radiation contamination of the coolant in an atomic reactor in which the coolant ducts are arranged in sets, and the sets are arranged in groups, comprising sampling circuits for all the ducts of a group adapted to be switched, under the control of a single instruction transmitter, automatically and successively to first radiation detectors and to be diverted to second radiation detectors in response to the detection of a predetermined level of activity.

According to a feature of the invention, the ducts are associated in sets, "$n$" by "$n$"; these sets are then assembled in groups "$p$" by "$p$." Each group of "$p$" sets is associated with a sample detector and a supervisory detector. The number of groups is $$G = \frac{N}{np}$$

N being the total number of ducts.

The duration T of a supervision cycle is fixed, $t$ being the time during which each set is supervised by the sample detector, and the following relationship results:

$$T = t \times p$$

which gives an order of magnitude for "$p$." It may be advantageous in certain cases to make "$n$" a number which is a sub-multiple of "$p$," in order to simplify the control circuits of the device to which the invention relates.

Various non-limitative examples of embodiments of the invention will be described hereinafter with reference to FIGURES 3 to 8 of the accompanying drawings, in which:

FIGURE 4 shows the sequence of operations in the device to which the invention relates, when working with time spaced instructions;

FIGURE 7 is a diagrammatic illustration of the electrical portion of a system for transmitting simultaneous instructions for controlling the testing operations.

Figure 1:
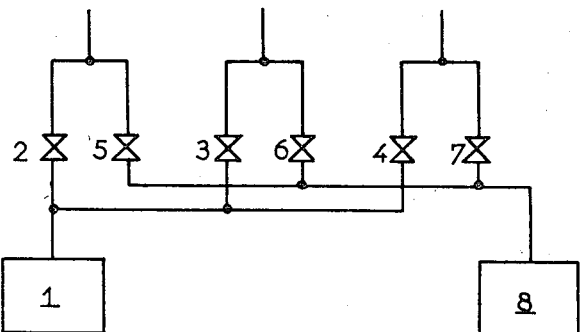
Figure 2:
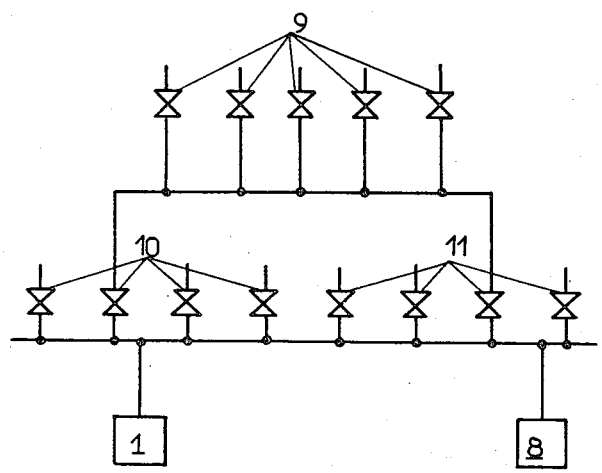
Figure 3:
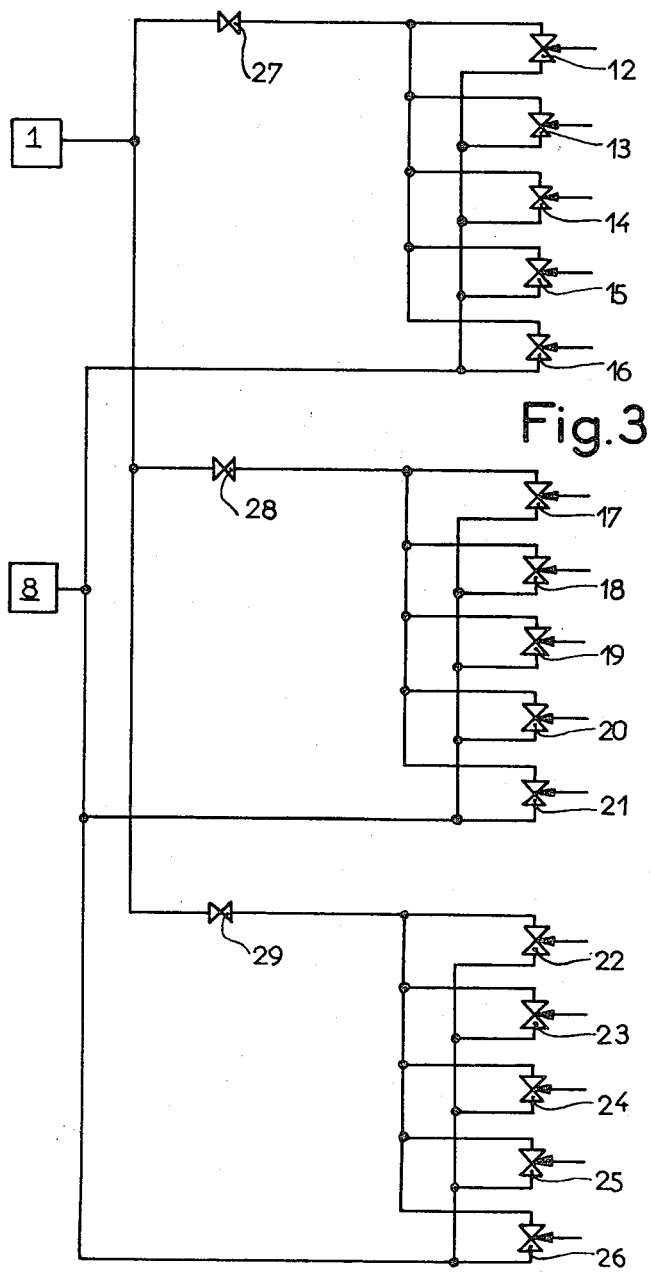
FIGURE 3 is a diagram showing the principle of the mechanical portion of the device to which the invention relates.

FIGURE 3 shows the fluid take-off circuits for three sets, each of five ducts. (A limit of three sets has been adopted for the sake of greater clarity in explanation.) Fluid is taken off by means of three-way remote-controlled valves 12, 13, 14, 15 and 16 for the first set, 17, 18, 19, 20 and 21 for the second set, and 22, 23, 24, 25 and 26 for the third set.

These valves 12 to 26 permanently direct the fluid derived from the two-way remote-controlled valves 27, 28 and 29. Opening of the valves 27, 28 and 29 allows a test to be made on the first, second and third sets respectively.

When an irregularity is discovered by the detector 1, for example during testing of the first set, the valve 27 is closed and the valves 12, 13, 14, 15, 16 are successively operated in such a manner as to direct the samples of fluid to the supervisory detector 8, which localises the duct responsible.

The information obtained may be put to use in two ways:

(1) Centralisation of these time spaced information elements in a single group (memory circuit for example);

(2) Separate posting of the information elements which are picked up simultaneously at each group of ducts.

In the first case, it must be possible to differentiate the results after putting them together. Time spaced instructions are therefore transmitted for the detectors to take charge of the sets. This is not necessary in the second case.

The sequence of testing operations on the ducts of a reactor is represented in FIGURE 4. A limit of two complete sets with a partial third set has been adopted in the figure, but it is quite clear that the sequence of operations for ten sets may be deduced from the figure. These are time spaced operations. In this particular example, the reactor comprises five hundred ducts divided into ten groups each of ten sets of five ducts which are taken charge of by ten pairs of detectors (sample detectors and supervisory detectors).

In FIGURE 4, which is a double-entry table, the times are plotted as the ordinant, and the signs "O," "AN" and "CS," which means "instruction," "cancellation of instruction" and "control of selector" respectively, are opposite the numbers of the corresponding pairs of detectors. FIGURE 4 shows that the first pair of detectors takes charge of the first set of the first group at zero time, the second pair of detectors takes charge of the first set of the second group at six seconds, etc. At the fifty-ninth second, the selector allows the pairs of detector to pass on to the second set of their group, at the hundred and nineteenth second, the selector allows them to pass on to the third set, etc.

Nevertheless, the testing of the first set of the first group by the first pair of detectors is finished at the time $t9 = 54$ seconds, and an instruction must be transmitted for testing of the first set to stop at $t9$, and for testing of the second set to start at the sixtieth second. This operation is repeated in identical fashion for all the detectors.

Figure 5:
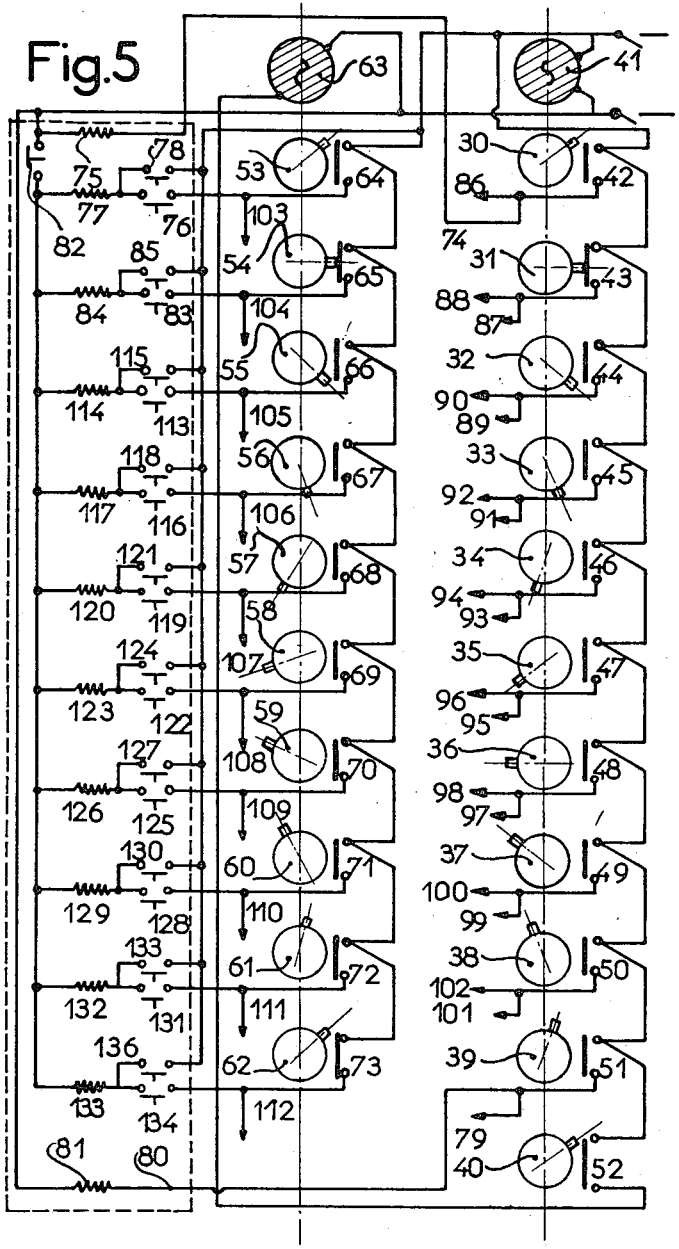
FIGURE 5 is a diagrammatic illustration of the electrical portion of a system for transmitting time spaced instructions for controlling the testing operations.

FIGURE 5 is a diagram of the electrical controls of a practical embodiment of the invention at a given time in the cycle.

An instruction-transmitting appliance, or timer, consists, for example, of rotating cams 30, 31, 32, 33, 34, 35, 36, 37, 38, 39 and 40, mounted on a common shaft and coupled to a synchronous electric motor 41. The motor 41 carries out a complete revolution in $t$ seconds, that is to say in the time taken to test each set. Each of the cams 30 to 40 successively closes one of the microswitches 42, 43, 44, 45, 46, 47, 48, 49, 50, 51 and 52 for a very short time equivalent to the duration of one pulse. The microswitches 42 and 52 are substantially synchronized.

A selector device which is similar in principle to the timer consists of the rotating cams 53, 54, 55, 56, 57, 58, 59, 60, 61 and 62, which are driven by a motor 63, and can act on the microswitches 64, 65, 66, 67, 68, 69, 70, 71, 72 and 73 respectively.

The motor 63 is fed in intermittent fashion when the cam 40 closes the microswitches 52. Opening of the instruction microswitch of order $m$ and closure of the instruction microswitch of order $m+1$ (in the group 64 to 73) correspond to each partial rotation of the motor 63.

The starting conditions at the beginning of a test cycle are as follows:

The microswitch 73 is closed, and the microswitches 64 to 72 are open. Under these conditions, the first pair of detectors is ready to take charge of the first set of the first group of ducts.

In the following, as in FIGURE 5, only the first pair of detectors is dealt with in order to simplify the explanation. Rotation of the timer driven by the motor 41 closes the microswitch 52. The motor 63 rotates, thus freeing the microswitch 73 and closing the microswitch 64.

The cam 30 of the timer then closes the microswitch 42 for approximately one second, thus feeding a line 74. A relay 75 closes its contact 76, which completes the circuit of a relay 77. This relay 77 locks up over its contact 78, and causes the valve 27 to open (FIGURE 3).

The cams 31 to 39 perform a function which is identical with that of the cam 30. When the cam 39 closes the microswitch 51, the latter transmits, via the line 79, an instruction for the tenth pair of detectors to take charge of a set, and simultaneously transmits, via the line 80, a cancellation instruction to the first pair of detectors; relay 81 is energised, and opens its contact 82. The circuit 77, 78 is no longer energised, and the valve 27 (FIGURE 3) closes The cam 40 then acts on the microswitch 52; the motor 63 is energised, and causes the microswitch 64 to open, and the microswitch 65 to close. The cam 30 then closes the microswitch 42, thus energising the relay 75. The relay 75 closes its contact 83, thus allowing a relay 84 to be energised. This relay 84 locks up over its contact 85, while causing the valve 28 to open (FIGURE 3).

Operation of the other pairs of detectors may be deduced from the foregoing by proceeding in circular permutations, it being noted that:

The lines 80 and 74 serve respectively to transmit a cancellation instruction and an instruction for taking charge to the first pair of detectors, their equivalents for the other pairs of detectors being the pairs of lines 86—87, 88—89, 90—91, 92—93, 94—95, 96—97, 98—99, 100—101 and 102—79.

The groups of ten cables or wires 103, 104, 105, 106, 107, 108, 109, 110, 111 and 112 transmit instructions from the selector to all the pairs of detectors, not shown, except for the first pair as shown in the drawings.

Groups of elements 113—114—115, 116—117—118, 119—120—121, 122—123—124, 125—126—127, 128—129—130, 131—132—133 and 134—135—136 perform a function similar to that of the groups 76—77—78 and 83—84—85 for the other sets which are supervised by the first pair of detectors.

Operation of the device to which the invention relates has been considered in the foregoing under normal conditions. A description will be given hereinafter, with reference to FIGURE 6, of the process by which the supervisory detector takes charge of the operation.

Figure 6:
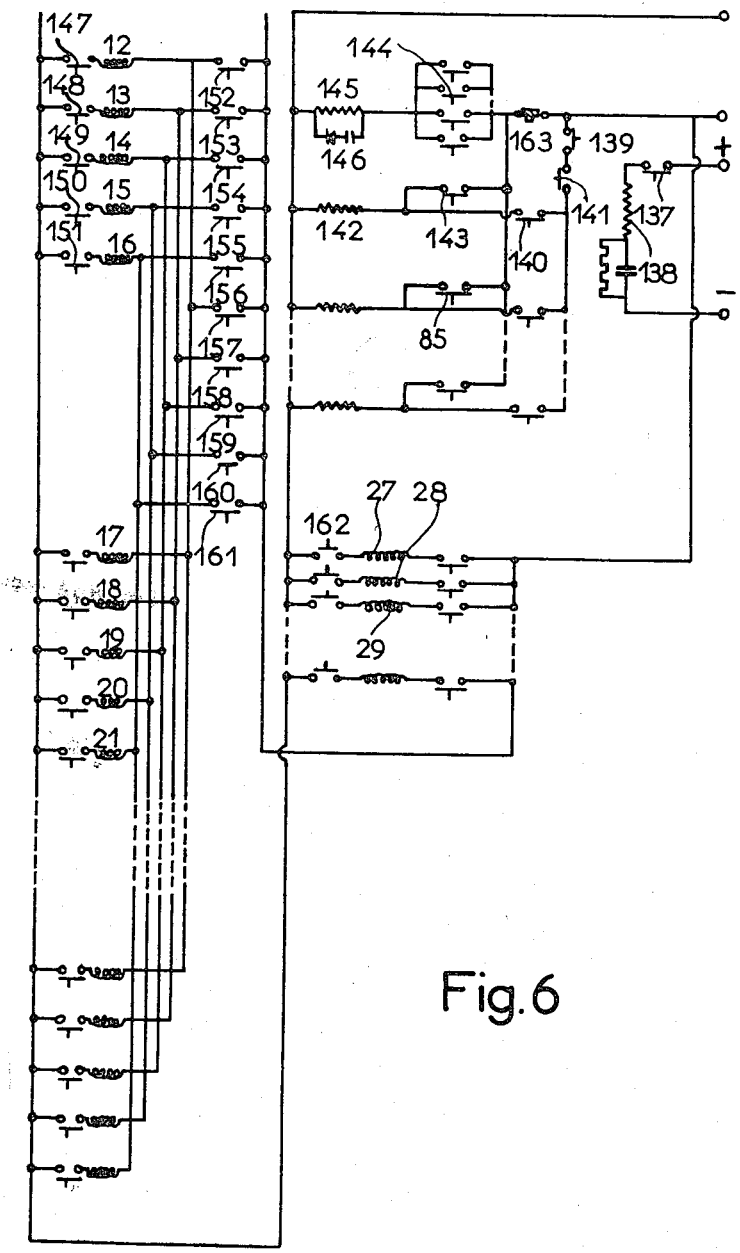
FIGURE 6 is a diagrammatic illustration of the manner in which the electrical valves are coupled in order to allow operation of the sample detectors and the supervisory detector(s) to be synchronised.

When an irregularity is detected by one of the sample detectors in the first set, a contact 137 closes, thus energising a relay 138. This relay 138 closes its contact 139. Moreover, the relay 77 corresponding to the first set (FIGURE 5) closes its contact 140 (FIGURE 6). A contact 141, which is normally closed, allows relay 142 to be energised and relay 142 locks up over its contact 143 and closes a contact 144. A relay 145, delayed by a device 146, opens its contact 141, thus making it impossible for the sets not affected by the irregularity to be taken charge of, that is to say preventing the relays equivalent to the relay 142, and corresponding to the other sets, from being energised.

The relay 142 in addition causes the contacts 147, 148, 149, 150 and 151 to close, and the latter are thenceforward ready to cause each of the three-way valves of the suspected set to open successively when the contacts 152, 153, 154, 155, 156, 157, 158, 159, 160 and 161, which operate in dependence on the operation of the timer (FIGURE 5), are closed. In order to divert the samples of gas from the suspected set to the supervisory detector, the relay 142 cuts off the circuit corresponding to this set by means of a contactor 162. This is clear if reference is made to FIGURE 3; opening of this contact 162 no longer allows the valve to open on subsequent cycles.

A circuit-breaker button at 163 (FIGURE 6) allows interruption of the holding circuit of the relay 142 thus making the supervisory detector available again.

A second example of embodiment of the device to which the invention relates is described with reference to FIGURE 7. In this example, the instructions transmitted by the timer are no longer time spaced.

A timer 164, comprising only a single rotating cam, closes a microswitch 165, thus causing intermittent rotation of a selector comprising ten cams 166, 167, 168, 169, 170, 171, 172, 173, 174 and 175.

When the cam 166 closes a microswitch 176, a relay 177 is energised and locks up over its contact 178. This allows a set to be selected. The cam 167 then closes a microswitch 179. Relay 180 is thus energised, opens its contact 181, thus releasing relay 177, and locks up over its contact 182. This causes the search on one set to stop, and a second set to be taken charge of. This operation is subsequently repeated in circular permutations for all the other sets.

The lines 183 to 192 serve to transmit instructions for taking charge to the other pairs of detectors.

The diagram shown in FIGURE 6 also applies to this second method of embodiment with simultaneous instructions.

It may be noted that, by deduction, it would be possible to use only a single supervisory detector. Statistical study of irregularities shows that there must be a number of supervisory detectors related to the number of ducts in the reactor.

It is also possible to allot one or more supervisory detectors to the same group of ducts, and this only requires a few simple modifications to the piping as compared to the system described above.

We claim:
1. In the control of gas sampling systems used in the detection of ruptured sheaths in heterogeneous atomic reactors in which a plurality of ducts of the reactor are connected in a gas circuit in a set and a plurality of sets are connected in a gas circuit in a group and forming a plurality of sets and groups for the reactor, a detector and a supervisory detector for each group, a sampling circuit for gas for each of the ducts, a two-way valve in each gas circuit of said sets, a main valve controlling gas flow in each of said sampling circuits between the outlet of its duct and its corresponding second valve having two gas exits one normally open and connected through said two-way valve to the associated detector of the group, the other of said exits being normally closed and connected to the associated supervisory detector of the group, automatic switch means for said main and two-way valves controlled in relation to time for all of the sets of the same order in each of said groups connecting said main and two-way valves to the detector of the group, a single timer controlling said switch means, said timer, when an anomaly is found in a set by said detector, closing said two-way valve for that set and automatically, successively, and in synchronization, continuing normal surveillance of the other sets and opening successively the second exit of each of said main valves of the suspect set thereby directing a sample of gas from each duct of the suspect set to said supervisory detector of the group to which the suspect set is related.

2. A control system as described in claim 1, a cam shaft for said timer uniformly rotated and completing one full turn during the time of surveillance of one of said sets, cams on said cam shaft corresponding in number to the number of said groups and controlling said groups in sequence, said cams at equal intervals of time determining the cycle when the corresponding one of said detectors takes charge of said groups, a supplementary cam on said cam shaft, a second cam shaft, second cams on said second cam shaft one for each set of a group and equally and angularly displaced around said second cam shaft, said supplementary cam causing intermittent rotation of said second cam shaft, said second cam shaft being displaced during each intermittent step through an angle equal to the angular displacement between successive cams on said second cam shaft, each of said second cams opening communication when in a predetermined position between each set of the same order of each group and said detector of the group.

3. A control system as described in claim 1, in which the relation of the time between the beginning of surveillance of the different sets of the same order in the different groups is rigidly synchronized, said timer comprising a single rotary cam, a selector intermittently actuated by said single cam, ten cams equally and angularly spaced on said selector, said selector being turned through one-tenth of a rotation for each complete rotation of said timer, each of said last named ten cams closing a contact discontinuing the simultaneous operation on all of the sets of the same order in all of the groups.

References Cited in the file of this patent

UNITED STATES PATENTS 2,939,953     Parsons et al. _____ June 7, 1960

OTHER REFERENCES

Proceedings of the Second International Conference on the Peaceful Uses of Atomic Energy, Geneva, Sept. 1–13, 1958, vol. 7, pp. 493 and 494.

Nucleonics, vol. 14, (December 1956), pp. S20 and S21.

Engineer (London), vol. 203, (Feb. 8, 1957), pp. 218, 219.

Nuclear Power (March 1957), pp. 91–95.